(12) United States Patent
Zou et al.

(10) Patent No.: US 10,989,868 B1
(45) Date of Patent: Apr. 27, 2021

(54) FABRIC ITEMS WITH THERMALLY IMPRINTED LIGHT-EMITTING REGIONS

(71) Applicant: Apple Inc., Cupertino, CA (US)

(72) Inventors: Yi Zou, Sunnyvale, CA (US); Hua Song, San Jose, CA (US); Liming Wang, Windham, NH (US); Daniel A. Podhajny, San Jose, CA (US)

(73) Assignee: Apple Inc., Cupertino, CA (US)

( * ) Notice: Subject to any disclaimer, the term of this patent is extended or adjusted under 35 U.S.C. 154(b) by 154 days.

(21) Appl. No.: 16/051,354

(22) Filed: Jul. 31, 2018

Related U.S. Application Data

(60) Provisional application No. 62/558,558, filed on Sep. 14, 2017.

(51) Int. Cl.
| | | |
|---|---|---|
| *G02B 6/00* | (2006.01) |
| *G02B 6/036* | (2006.01) |
| *F21V 8/00* | (2006.01) |
| *C03C 25/105* | (2018.01) |
| *D21H 21/30* | (2006.01) |

(52) U.S. Cl.
CPC ........ *G02B 6/03694* (2013.01); *C03C 25/105* (2013.01); *D21H 21/30* (2013.01); *G02B 6/0008* (2013.01); *G02B 6/03616* (2013.01); *D10B 2401/20* (2013.01)

(58) Field of Classification Search
CPC .............. G02B 6/03694; G02B 6/6008; G02B 6/03616; G02B 6/0008; D21H 21/30; C03C 25/105; D10B 2401/20
See application file for complete search history.

(56) References Cited

U.S. PATENT DOCUMENTS

| | | | |
|---|---|---|---|
| 4,519,017 A | 5/1985 | Daniel | |
| 6,246,428 B1 * | 6/2001 | Look | B41M 5/38207 |
| | | | 347/212 |
| 6,490,402 B1 * | 12/2002 | Ota | D02G 3/441 |
| | | | 257/E25.02 |
| 7,234,853 B2 * | 6/2007 | Givoletti | B60R 13/02 |
| | | | 160/10 |
| 7,683,279 B2 * | 3/2010 | Kim | G02B 6/0036 |
| | | | 200/310 |
| 9,730,429 B2 * | 8/2017 | Hurwitz | A01K 27/006 |
| 2006/0093809 A1 * | 5/2006 | Hebrink | B29C 55/023 |
| | | | 428/323 |
| 2007/0062433 A1 * | 3/2007 | Hurwitz | A01K 27/006 |
| | | | 114/230.2 |

(Continued)

*Primary Examiner* — Gerald J Sufleta, II
(74) *Attorney, Agent, or Firm* — Treyz Law Group, P.C.; G. Victor Treyz; Matthew R. Williams

(57) ABSTRACT

An item such as a fabric-based item may have a layer of fabric such as a layer of woven fabric. The fabric layer may include warp and weft strands. The fabric may cover keys in a keyboard or may be used in forming other structures in the fabric-based item. Each key may have an illuminated key label. Portions of the fabric may be processed by pressing heated protrusions on a textured mold into polymer optical fibers in the fabric. The protrusions form corresponding light-scattering recesses in cladding portions of the optical fibers. Light-emitting diodes or other light sources may be coupled to respective end surfaces of the optical fibers. The light-emitting diodes emit light that is emitted from the thermally imprinted light-emitting regions formed by pressing the heated protrusions into the optical fibers.

19 Claims, 7 Drawing Sheets

(56) References Cited

U.S. PATENT DOCUMENTS

| | | | |
|---|---|---|---|
| 2007/0205526 A1* | 9/2007 | Sato | B29D 11/00721 |
| | | | 264/1.24 |
| 2007/0236939 A1 | 10/2007 | Ouderkirk et al. | |
| 2007/0281155 A1 | 12/2007 | Tao et al. | |
| 2011/0217665 A1* | 9/2011 | Walsh | C03C 25/626 |
| | | | 433/29 |
| 2013/0260104 A1* | 10/2013 | Dua | B32B 27/08 |
| | | | 428/175 |
| 2015/0062954 A1* | 3/2015 | Crossland | D03D 15/00 |
| | | | 362/552 |
| 2015/0131955 A1* | 5/2015 | Bennett | G02B 6/04 |
| | | | 385/123 |
| 2017/0351023 A1* | 12/2017 | Alkeskjold | C03C 25/607 |
| 2018/0120502 A1* | 5/2018 | Sasaki | G02B 6/02023 |

* cited by examiner

FABRIC ITEMS WITH THERMALLY IMPRINTED LIGHT-EMITTING REGIONS

This application claims the benefit of provisional patent application No. 62/558,558, filed Sep. 14, 2017, which is hereby incorporated by reference herein in its entirety.

FIELD

This relates generally to fabric-based items, and, more particularly, to fabric-based items having fabric that emits light.

BACKGROUND

Weaving and other techniques for intertwining strands of material can be used to form fabric. Fabric is sometimes used in forming structures in electronic equipment. A layer of fabric may, for example, be used to cover the keys in a keyboard.

In some keyboards, light-emitting diodes are used to provide keys with backlight. This allows keyboards to illuminate key symbols.

It can be challenging to create illumination for fabric-based items. If care is not taken, fabric-based items will not have visually appealing illumination, will be too complex to manufacture, or will not have desired patterns of illumination.

SUMMARY

An item such as a keyboard may have a layer of woven fabric or other fabric. The fabric may cover keys in the keyboard or may be used in forming other structures in a fabric-based item.

Each key in a keyboard may have an illuminated key label. Portions of the fabric may be processed by pressing heated protrusions on a textured mold into polymer optical fibers in the fabric. The protrusions form corresponding light-scattering recesses in cladding portions of the optical fibers. By patterning the protrusions on the mold, corresponding thermally imprinted light-emitting regions may be formed in the fabric. Fabric may include polymer strands with melting temperatures higher than the optical fibers, allowing thermal imprinting operations to be selectively performed on the optical fibers without damaging the other strands in the fabric.

In a fabric-based item, light-emitting diodes or other light sources may be coupled to respective end surfaces of the optical fibers in a fabric layer. The light-emitting diodes emit light that is emitted from the thermally imprinted light-emitting regions.

Keys may be formed from key members and switches. The key members may be overlapped by key labels formed from the thermally imprinted light-emitting regions. If desired, conductive strands of material may be incorporated into the fabric of a keyboard or other item and may be used in forming touch sensor structures.

DETAILED DESCRIPTION

Figure 1:
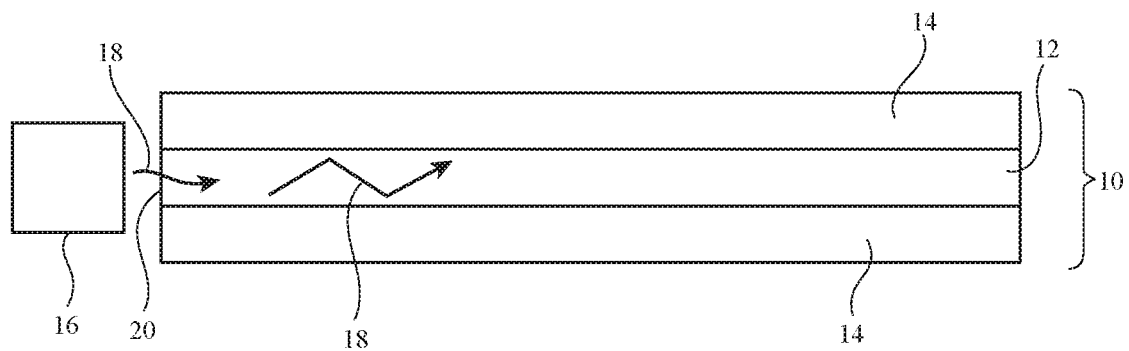
FIG. 1 is a cross-sectional side view of an illustrative optical fiber in accordance with an embodiment.

Fabric and other materials may be used in forming fabric-based items. For example, fabric may be used in forming portions of a stand-alone electronic device such as a cellular telephone, tablet computer, wrist-watch device, laptop computer, media player, pendant device, a device embedded in eyeglasses or other equipment worn on a user's head, or other electronic equipment, may be used in forming a strap, a case, a cover, or other accessory for an electronic device (e.g., a cover or other accessory that includes a keyboard), may be used in forming accessories such as headphones, may be used in forming straps, pockets, walls in a bag, or parts of other enclosures, may be used in forming seating or other furniture for a home or office, may be used in forming a seat, dashboard, steering wheel, seatbelt, or other item in a vehicle, may be used in forming part of an embedded system such as a system in which fabric-based equipment is mounted in a kiosk, may be used in forming wearable items such as a necklace, wrist band, arm band, head band, or other wearable band, shoe, glove, hat, or other item of clothing, may be used in forming a wallet or purse, may be used in forming cushions, blankets, or other household items, may be used in forming toys, may be used in forming other equipment with circuitry, or may be used in forming structures that implement the functionality of two or more of these items.

Items such as these may include circuitry for supporting input-output features and other functionality. Items such as these may, for example, include keys. The keys may have associated key switches (e.g., dome switches, etc.) so that key presses on the keys by the fingers of a user may be detected. If desired, capacitive touch sensor circuitry may be incorporated into a fabric-based item. Capacitive touch sensor circuitry may, for example, overlap keys in a keyboard or may be included in fabric-based items without keys.

Keys may be arranged in keyboard arrays or may, in some configurations, be used as stand-alone buttons. Circuitry in a fabric-based item may contain a light source for generating light that is viewable by a user of the item. The light may be emitted from selectively patterned thermally imprinted light-emitting regions.

Light that is emitted from the fabric may be used as general purpose illumination (e.g., light to illuminate an interior portion of a bag or other enclosure), may be used as light that illuminates a user's ambient environment (as with a flashlight), may be used to illuminate a symbol or other patterned structure on the surface of a keyboard or other item (e.g., a keyboard key label), may serve as backlight illumination for a display having an array of individually adjustable pixels, may provide backlight for a patterned key label opening or other pattern in a dark ink layer or other opaque layer, may provide illumination for a status indicator (e.g., a one-element or multi-element battery strength indicator, a wireless signal strength indicator, a power status indicator, or other symbol for a status indicator), may support wireless light-based communications (e.g., with external equipment), and/or may be used in other light-based applications.

With an illustrative configuration, which may sometimes be described herein as an example, fabric may be provided with optical fibers that are selectively processed to form fabric with thermally imprinted light-emitting regions. The fabric may overlap keys in a keyboard, may overlap buttons in other electronic equipment, or may be incorporated into other fabric-based items.

FIG. 1 is a cross-sectional side view of an illustrative optical fiber into which light is being emitted from a light source. As shown in FIG. 1, optical fiber 10 may include core 12 and cladding 14. Cladding 14 surrounds core 12. In some arrangements, additional coating layers may cover portions of optical fiber 10. For example, portions of optical fiber 10 may be coated with a buffer layer, patterned or uniform coatings such as polymer coatings containing colorant, metal films, and/or other coatings. The configuration of FIG. 1 is presented as an example.

Core 12 has a first index of refraction. Cladding 14 has a second index of refraction that is lower than the first index of refraction. The refractive index of cladding 14 may, as an example differ from the refractive index of core 12 by 0.050.15, by at least 0.02, at least 0.06, at least 0.1, at least 0.13, at least 0.15, less than 0.2, or other suitable amount. In general, core 12 and/or cladding 14 may be formed from any suitable transparent materials (polymer, glass, etc.).

With one illustrative configuration, which is described herein as an example, both core 12 and cladding 14 are formed from polymer (e.g., optical fiber 10 may be a polymer optical fiber). Core 12 may, as an example, be formed from an acrylic polymer such as polymethyl methacrylate (PMMA) with a refractive index of about 1.49 and cladding 14 may be formed from an elastomeric polymer such as silicone with a refractive index of about 1.46. Other polymers may be used, if desired.

The diameter of core 12 may be at least 5 microns, at least 10 microns, at least 20 microns, at least 40 microns, at least 80 microns, at least 160 microns, less than 360 microns, less than 180 microns, less than 90 microns, less than 45 microns, less than 30 microns, less than 15 microns, or other suitable size. The outer diameter of cladding 14 may be at least 10 microns, at least 20 microns, at least 40 microns, at least 80 microns, at least 160 microns, less than 360 microns, less than 180 microns, less than 90 microns, less than 45 microns, less than 30 microns, less than 15 microns, or other suitable size. Optical fiber 10 may have a length of at least 1 mm, at least 5 mm, at least 1 cm, at least 2 cm, at least 4 cm, at least 10 cm, at least 20 cm, at least 50 cm, at least 150 cm, at least 500 cm, at least 1 m, less than 50 m, less than 5 m, less than 2 m, less than 600 cm, less than 300 cm, less than 100 cm, less than 30 cm, less than 12 cm, less than 6 cm, less than 3 cm, less than 2 cm, less than 1 cm, less than 5 mm, or other suitable length.

Optical fiber 10 may receive illumination from light source 16. Light source 16 may include one or more light-emitting diodes, lasers, or other light emitting devices that emit light 18. For example, light source 16 may include a light-emitting diode such as a white light-emitting diode or a light-emitting diode that emits light of a non-neutral color (e.g., red light, blue light, green light, etc.). Configurations in which light source 16 includes multiple light-emitting diodes may also be used. The multiple light-emitting diodes may respectively emit light of different colors. With this type of arrangement, the overall color of the light emitted from light source 16 can be adjusted by adjusting the respective strengths of the multiple light-emitting diodes within source 16. Arrangements in which light source 16 is a light-emitting diode or includes multiple light-emitting diodes may sometimes be described herein as an example.

During operation, light source 16 emits light 18. Light 18 may be coupled into core 12 at end surface 20 of fiber 10. Because the refractive index of cladding 14 is lower than the refractive index of core 12, light 18 will be guided within optical fiber 10 in accordance with the principal of total internal reflection and will propagate along the length of optical fiber 10.

Figure 2:
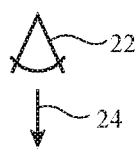
FIG. 2 is a cross-sectional side view of the illustrative optical fiber of FIG. 1 following patterning to create thermally imprinted light-emitting regions in accordance with an embodiment.
Figure 2:
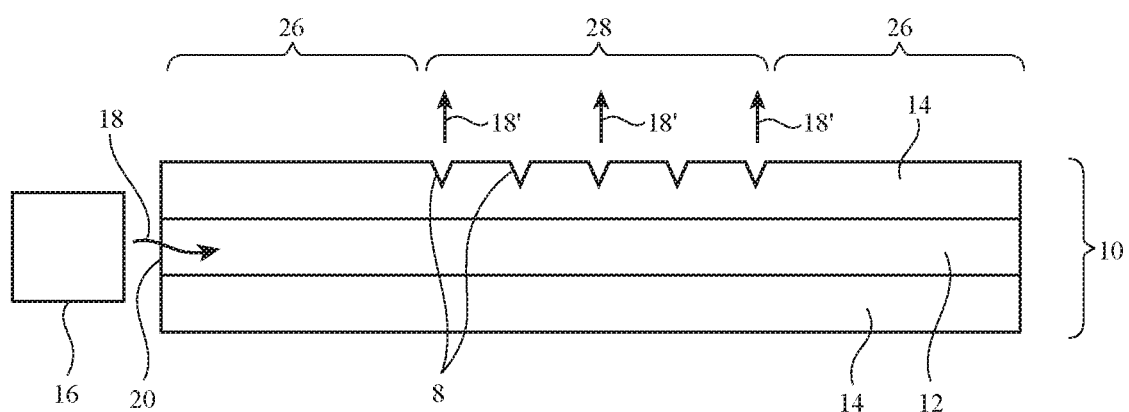

To cause light 18 to be scattered out of fiber 10 at selected locations along the length of fiber 10, fiber 10 can be patterned using a thermal imprinting tool. Fiber 10 may, as an example, be pattered along with other fibers 10 after incorporating fiber 10 into fabric. The tool may have a heated portion with protrusions that penetrate into optical fiber 10 at selected locations. As shown in FIG. 2, this can create localized areas of thermally imprinted light-scattering structures 8 in fiber 10 (e.g., thermally imprinted recesses in cladding 14 that have softened during processing at elevated temperature and rehardened after cooling).

The presence of light-scattering structures 8 locally defeats total internal reflection and scatters light 18 from core 12 outwardly as scattered light 18'. A user such as viewer 22 who is viewing optical fiber 10 in direction 24 can view scattered light 18' in thermally imprinted light-emitting regions such as region 28. Other regions, such as regions 26 of FIG. 2, do not contain light-scattering structures 8 and therefore will not emit light 18'. In this way, key labels, decorative trim structures, symbols such as icons for status indicator lights, and/or other light-emitting structures can be incorporated into a fabric-based item.

Figure 3:
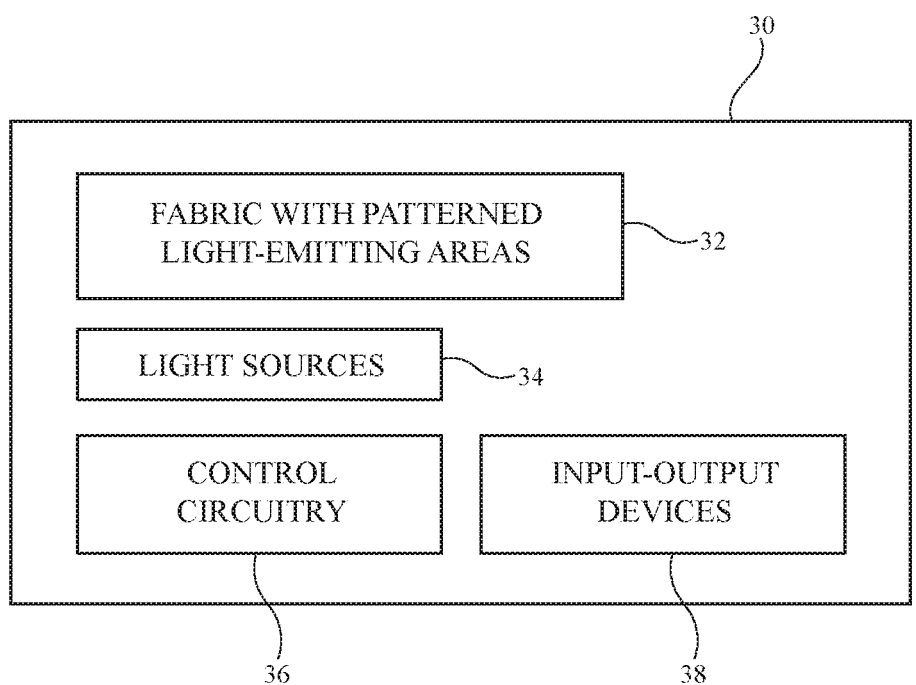
FIG. 3 is a schematic diagram of an illustrative device of the type that may have fabric with selectively patterned light-emitting regions in accordance with an embodiment.

A schematic diagram of an illustrative fabric-based item of the type that may include one or more light-emitting optical fibers such as fiber 10 of FIG. 2 is shown in FIG. 3. Item 30 may contain fabric (e.g., fabric with thermally imprinted light-emitting regions) that forms all or part of a housing wall for item 30 (e.g., a wall that forms one or more external surfaces for item 30), may form internal structures for item 30, may form cosmetic structures for item 30, or may form other fabric-based structures. The fabric of item 30 may be soft (e.g., item 30 may have a fabric surface that yields to a light touch), may have a rigid feel (e.g., the surface of item 30 may be formed from a stiff fabric), may be coarse, may be smooth, may have ribs or other patterned textures, may have raised and/or depressed regions formed by embossing or other techniques, and/or may be formed as part of a structure that has portions formed from non-fabric structures of plastic, metal, glass, crystalline materials, ceramics, or other materials.

Item 30 may have control circuitry 36. Control circuitry 36 may include storage and processing circuitry for supporting the operation of item 30. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 36 may be used to control the operation of item 30. The processing circuitry may be based on one or more microprocessors, microcontrollers, digital signal processors, baseband processors and other wireless communications circuits, power management units, audio chips, application specific integrated circuits, etc. Wired and/or wireless communications circuitry in circuitry 36 (e.g., wireless local area network circuitry including radio-frequency transceivers and antennas operating at 2.4-5 GH, 700-2700 MHz, higher or lower frequency bands, etc.) may be used to support communications between item 30 and external equipment. For example, in configurations in which item 30 is a keyboard or other electronic equipment that serves as an accessory for host equipment, communications circuitry may allow item 30 to communicate with a tablet computer, desktop computer, cellular telephone, set-top box, television, or other electronic devices.

Input-output circuitry in item 30 such as input-output devices 38 may be used to allow data to be supplied to item 30 and to allow data to be provided from item 30 to external devices. During operation, control circuitry 36 may use input-output devices 38 to gather input from a user, external equipment, and/or the environment around item 30. Control circuitry 36 may also use input-output devices 38 to provide output to a user or external equipment.

Input-output devices 38 may include switches, buttons, joysticks, scrolling wheels, touch pads, key pads, keyboards, microphones, speakers, tone generators, vibrators, cameras, sensors such as touch sensors (e.g., capacitive touch sensors), capacitive proximity sensors, light-based proximity sensors, ambient light sensors, compasses, gyroscopes, accelerometers, moisture sensors, force sensors, data ports, displays, and other input-output devices. Keys, buttons, status indicators, displays, trim structures, and other portions of item 30 may be illuminated. For example, fabric may contain optical fibers such as optical fiber 10 of FIG. 2 with light-emitting regions such as thermally imprinted light-emitting region 28. The light-emitting regions may form symbols (e.g., letters and other alphanumeric characters, icons, etc.) or other illuminated shapes. The symbols or other patterned openings may form labels on keys, buttons, or other input-output devices, may form labels on other illuminated structures, may form trim for a component (e.g., a halo surrounding a key), or may form other suitable illuminated areas.

Figure 4:
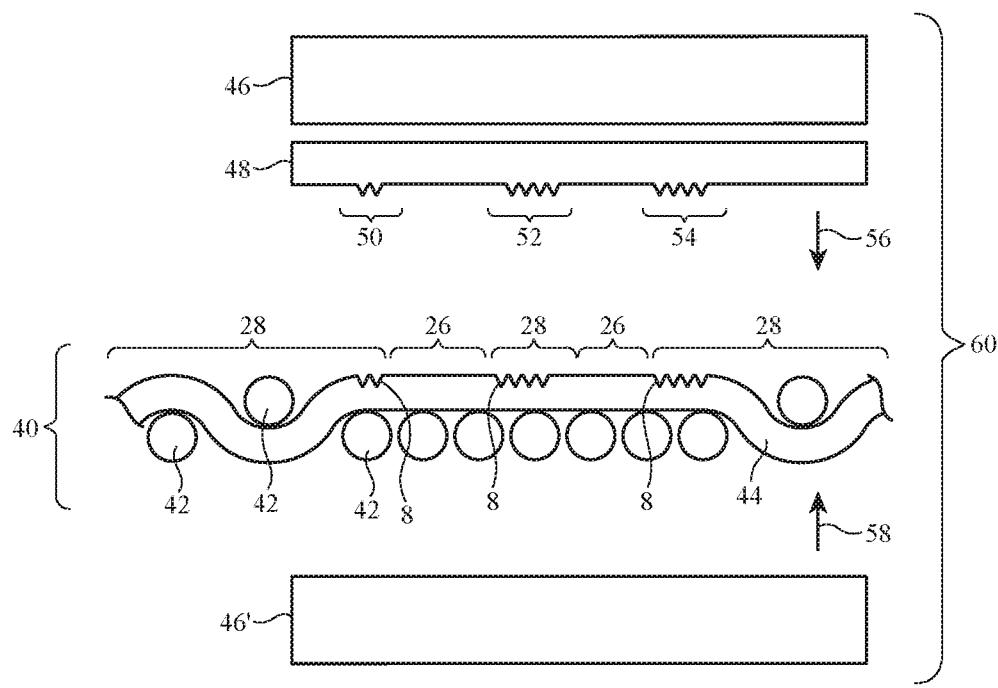
FIG. 4 is a diagram of illustrative equipment for patterning fabric to form thermally imprinted light-emitting regions in accordance with an embodiment.

Fabric for item 30 may be formed from intertwined strands of material. A cross-sectional side view of an illustrative layer of fabric for item 30 is shown in FIG. 4. As shown in FIG. 4, fabric 40 may include strands of material such as strands 42 and strands 44. Fabric 40 may be processed using processing equipment 60 to selectively form thermally imprinted light-emitting regions 28 while leaving regions 26, which are sometimes referred to as light-scattering-free regions, unprocessed regions, or non-scattering regions, free of light-scattering structures. Processing equipment 60 may include a textured mold such as mold 48 for forming light-scattering structures 8 in optical fibers 10 in selected regions 28 of fabric 40.

Fabric 40 may be formed from strands of material that are intertwined using any suitable intertwining technique. With one suitable arrangement, fabric 40 may be a woven fabric (e.g., strands 42 may be warp strands and strands 44 may be weft strands that are woven together to form fabric 40 using weaving equipment). Other arrangements may be used for intertwining strands of material for forming fabric 40 for item 30, if desired. In general, fabric 40 may be woven, knitted, braided, may be intertwined to form felt, or may contain strands of material that have been intertwined using other intertwining techniques.

Fabric 40 may include one or more woven layers or one or more fabric layers formed from other intertwining techniques. If desired, layers of plastic and/or other materials may be coupled to one or more layers of fabric. In some arrangements, fabric 40 may include coatings (e.g., polymer coatings to prevent accumulation of dirt, materials that serve as moisture barrier layers, wear resistant coatings, transparent coatings such as patterned translucent coatings, etc.). These coating materials may penetrate into fabric 40 and/or may form layers on the inner and/or outer surfaces of fabric 40.

The strands of material that form fabric 40 may include insulating strands (e.g., polymer strands such as optical fibers 10 and other fibers, etc.) and conductive strands (e.g., bare wire and/or wire coated with insulation). The strands forming fabric 40 may be monofilaments, may be multifilament strands (sometimes referred to herein as yarns, threads, or multifilament wire), may be formed from metal (e.g., metal monofilaments and/or yarns formed from multiple monofilament wires), may be formed from dielectric (e.g., polymer monofilaments such as optical fibers 10 and/or non-optical polymer fiber monofilaments and/or dielectric yarns formed from multiple polymer monofilaments), may include dielectric cores covered with conductive coatings such as metal (e.g., metal coated dielectric monofilaments and yarns of metal coated polymer-core monofilaments may be used to form conductive monofilaments and conductive yarns, respectively), may include outer insulating coatings (e.g., coatings of polymers or other dielectrics may surround each metal-clad polymer monofilament or each collection of metal-clad polymer monofilaments in a yarn, polymer insulation may enclose a multifilament metal wire, etc.), or may be other suitable strands of material for forming fabric. Optical fibers such as optical fiber 10 may be intertwined to form all of fabric 40 and/or portions of fabric 40.

With one illustrative configuration, at least some of the strands of material in fabric 40 are formed from strands of material that melt at relatively high temperatures (e.g., polyamide or other polymer that melts at about 250-270° C.). The core and/or cladding polymers of optical fibers 10 may have lower melting temperatures of about 95-160° C. For example, core 12 may be formed from PMMA that exhibits a melting temperature of about 100-160° C.

To form light-emitting regions 28, heated member 46 and mold 48 may be heated to a temperature that is sufficient to soften the polymer of optical fibers 10 during thermal imprinting without significantly softening the polymer of the higher-melting temperature polymer strands (e.g., a temperature of about 70-90° C.). This allows light-scattering structures 8 to be formed in selected portions of fibers 10 without damaging the other strands of material in fabric 40.

During formation of light-scattering structures 8, heated member 46 and mold 48 are pressed downwardly towards fabric 40 in direction 56 while member 46' is held stationary or is moved upwards in direction 58 towards fabric 40. Mold 48 may be a textured metal plate or other structure with microstructures such as protrusions 50, 52, and 54 (e.g., microstructures with dimensions on the order of 1-100 microns, at least 2 microns, at least 15 microns, at least 50 microns, less than 300 microns, or other suitable dimensions for forming correspondingly sized structures 8). As shown in FIG. 4, the protrusions on mold 48 may include shorter protrusions such as protrusions 50, longer protrusions such as protrusions 52 (e.g., protrusions that have a height from the surface of mold 48 that is greater than the height of protrusions 50 and that therefore form deeper light-scattering structures 8 in optical fibers 10 and correspondingly stronger light emission), and/or areas with protrusions of varying heights (see, e.g., region 54 of textured mold 48 of FIG. 4). Protrusions on mold 48 may have pyramidal shapes, conical shapes, ridge shapes (e.g., triangular ridges that extend parallel to each other), textures with patches of parallel ridges that are oriented in one or more respective directions), textures with protrusions of various heights, widths, shapes, etc.), and/or other textures.

Figure 5:
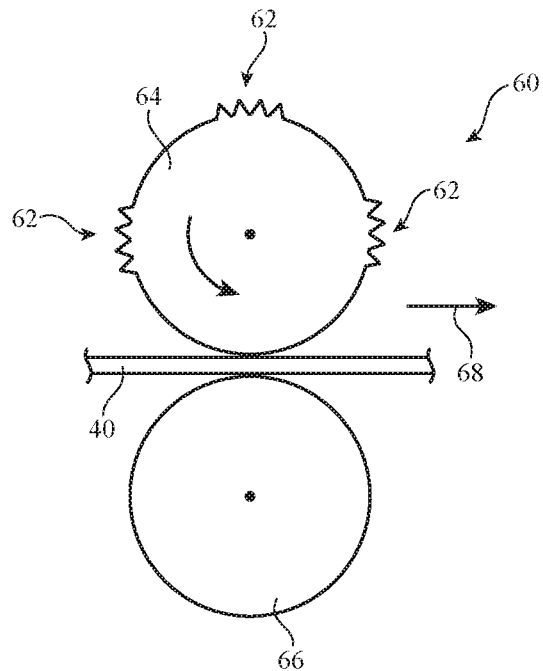
FIG. 5 is a diagram of illustrative roll-based processing equipment for patterning fabric to form thermally imprinted light-emitting regions in accordance with an embodiment.

As shown in FIG. 5, these textured regions of protrusions (e.g., protrusions 62 of FIG. 5) may be formed on the surface of a drum such as heated drum 64. As drum 64 and mating drum 66 rotate and fabric 40 moves in direction 68, fabric 40 is pressed between drum 64 and drum 66 and protrusions 62 form light-scattering structures 8 in the optical fibers 10 of regions 28 on fabric 40.

Figure 6:
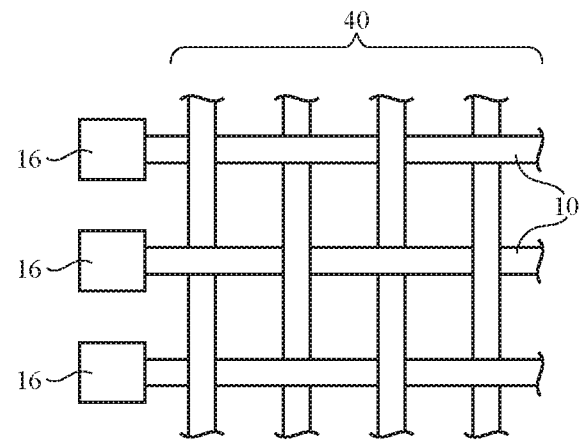
FIGS. 6, 7, and 8 are top views of illustrative configurations for illuminating optical fibers in fabric in accordance with an embodiment.

Light 18 may be emitted into fibers 10 using any suitable arrangement. In the example of FIG. 6, each of optical fibers 10 is coupled to a respective light source 16. Each light source 16 may be individually controlled (e.g., its current can be individually adjusted to adjust the corresponding magnitude of its output light 18). Optical fibers 10 may be intertwined with other optical fibers 10 (e.g., orthogonal optical fibers 10 that receive light from one or more light sources) and/or may be intertwined with other strands (e.g., parallel or orthogonal strands that are not coupled to light sources 16 and that are not illuminated with light 18). Woven fabric 40 may include optical fibers 10 that run horizontally, that run vertically, that run both horizontally and vertically, and/or that have other orientations (as examples). Fabric 40 may, for example, be woven fabric in which optical fibers 10 serve as weft fibers, warp fibers, or both warp and weft fibers. Other strands of material (monofilaments of polyamide and/or other material, multifilament polyamide yarn and/or other yarn, etc.) may also form weft strands, warp strands, and/or both warp and weft strands.

Figure 7:
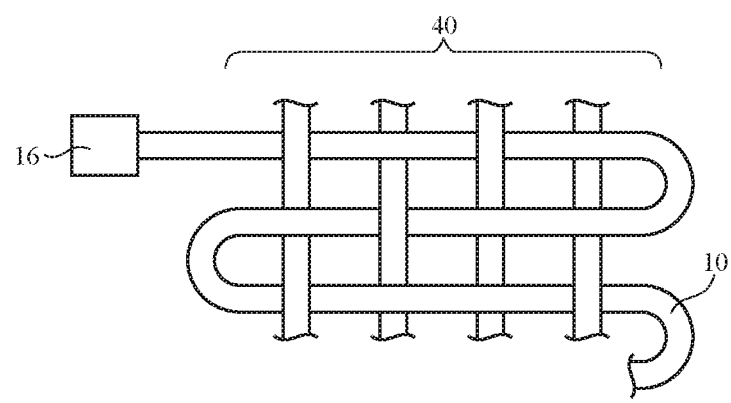

In the illustrative configuration of FIG. 7, a single optical fiber 10 may be used as a weft strand (weft fiber) that is incorporated into multiple rows of fabric 40. The weft strand formed from optical fiber 10 of FIG. 7 extends back and forth across the fabric in multiple rows of the fabric. This single optical fiber may be illuminated by light 18 from a single light source. Arrangements of the type shown in FIG. 7 may help reduce the number of light sources 16 that are used in illuminating light-scattering regions 28 of fabric 40.

Figure 8:
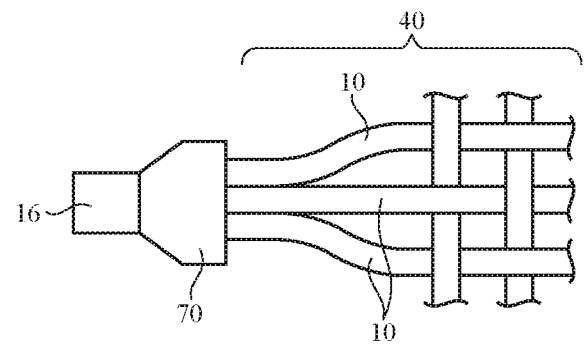

Another illustrative configuration for providing light 18 from light source 16 to optical fibers 10 is shown in FIG. 8. In the example of FIG. 8, optical coupler 70 receives light 18 from light source 16 and distributes light 18 to optical fibers 10. Coupler 70 has an input port coupled to light source 16 and a shape that helps distribute desired amounts of light received from light source 16 to output ports each of which is coupled to a respective one of optical fibers 10.

Figure 9:
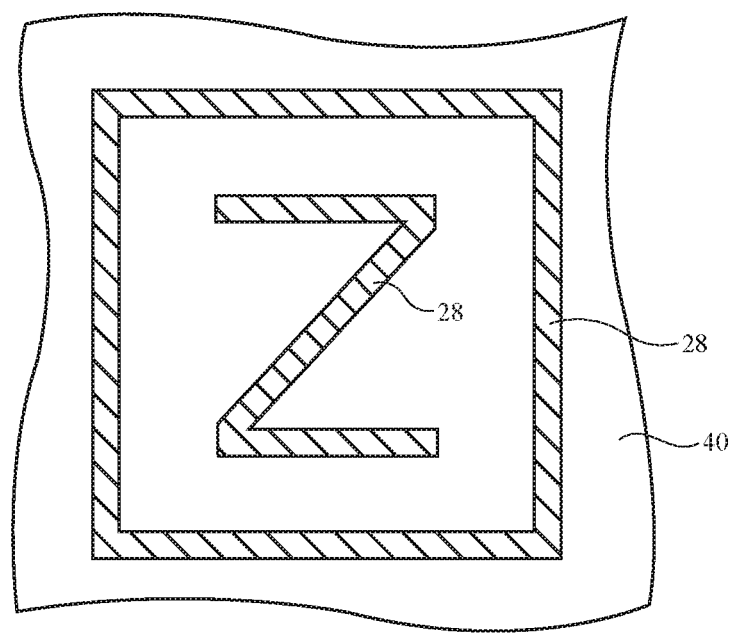
FIG. 9 is a top view of a key with illustrative thermally imprinted light-emitting regions in accordance with an embodiment.

FIG. 9 is a top view of a portion of an illustrative keyboard or other fabric-based item (item 10) having keys formed from fabric 40. Each key may have a corresponding key member (sometimes referred to as a key cap) that is overlapped by a respective portion of fabric 40 with thermally imprinted light-scattering structures 28. Thermally imprinted light-scattering structures 28 may form a key label or may form a backlight region (e.g., a rectangular patch) that is overlapped by a dark ink with a patterned key label opening or other opaque structure with an opening for creating backlight symbol using backlight illumination from light-scattering structures 28.

In the example of FIG. 9, light-scattering regions 28 have been configured to form a key label for the letter "Z" that is surrounded by a rectangular trim structure (e.g., a rectangular trim that follows the outline of the Z key in a keyboard). Item 10 in this example may be a keyboard that is integrated into an electronic device such as a laptop computer or other device with keys (buttons) and/or may be an accessory keyboard (e.g., a keyboard integrated into a fabric tablet computer cover or other fabric-based item).

In an illustrative configuration, fabric 40 may be a fabric layer that forms an outer surface for a keyboard housing or other electronic device housing (fabric-based item housing) and fabric 40 may have an array of keys such as the key of FIG. 9. In general, the keys of item 10 may be arranged in a QWERTY keyboard layout (e.g., in configuration in which item 10 forms a keyboard such as a keyboard in a removable device cover and/or other fabric-based item), may form a keypad (e.g., a numeric keypad, a keypad with symbols such as letters, numbers, and other symbols, etc.), may form one or more buttons (e.g., buttons on the front or side of a watch strap or other portion of a watch, a cellular telephone cover or other portion of a cellular telephone or cellular telephone accessory), may form part of a bag, clothing, seat, etc.

It may be desirable to incorporate one or more touch sensors into item 10. As an example, it may be desirable to form a capacitive touch sensor in item 10. If desired, fabric 40 may contain conductive strands that serve as capacitive touch sensor electrodes. The conductive strands may be woven with insulating warp and weft strands to form fabric 40 and may form a touch sensor for a track pad, a touch-sensitive slider or button, a two-dimensional touch sensitive input area on a shirt or other item of clothing, a touch sensitive input device for a wearable fabric band, a touch sensitive portion of a removable electronic device case (cover), and/or other suitable touch sensor structures. Light-scattering structures 28 may form key labels, trim, icons, and/or other labels and light-emitting patterns that overlap one or more regions of the touch sensor formed in fabric 40. During operation, control circuitry 36 can process touch sensor input from the capacitive touch sensor electrodes to determine when a user's finger or other external device has provided touch input and to determine the location of the touch input. Control circuitry 36 can then take suitable action (e.g., by lighting up one or more light-scattering regions 28 in response to the touch input, etc.). Light-scattering regions 28 may also provide output such as text output, illuminated icon output, and other illumination in these regions based on other information (e.g., based on receiving messages, based on alarms expiring, based on a desire to provide output corresponding to a sensor reading, based on a desired to provide a user with an alert or other output, etc.).

Figure 10:
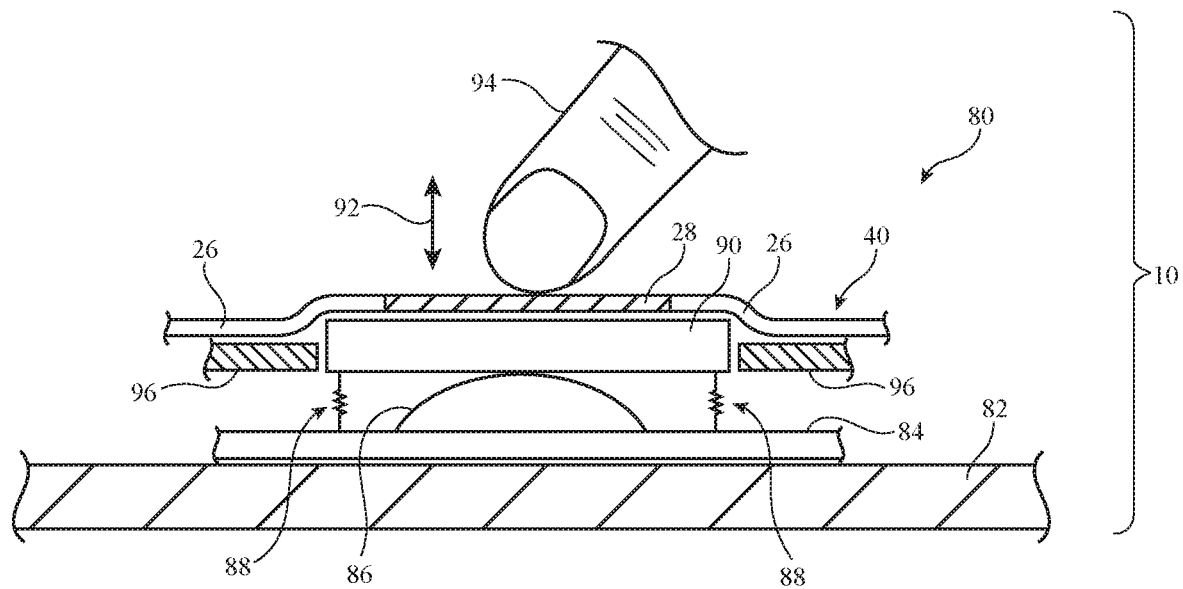
FIGS. 10 and 11 are side views of illustrative keys including fabric with thermally imprinted light-emitting regions in accordance with embodiments.
Figure 11:
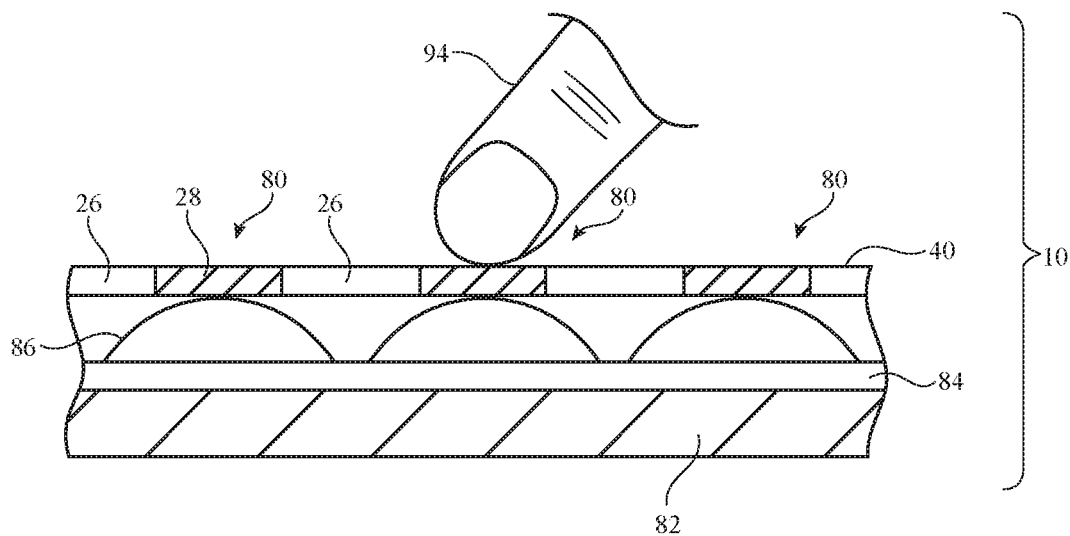

FIGS. 10 and 11 are cross-sectional side views of illustrative fabric-based items 10 that include key keys 80. Keys 80 may, for example, be arranged to form a keyboard.

As shown in FIG. 10, item 10 may include a housing such as housing 82 (e.g., a rear housing wall, sidewalls, and/or other housing wall structures). Housing 82 may include portions formed from plastic, metal, fabric, and/or other materials. Electrical components (see, e.g., FIG. 3) may be housed within housing 82. Fabric 40 may form a housing wall (e.g., an upper housing wall) or other structure in item 10.

Electrical components such as dome switches 86 may be mounted on printed circuit 84. Springs or other flexible coupling structures (sometimes referred to as biasing structures or compressible structures) may be used to couple a movable key member such as member 90 to printed circuit 84 and/or housing 82 or other support structures. Key member 90 may move in directions 92 within an opening in support layer 96. Fabric 40 may overlap keys 80. Fabric 40 may have regions that do not emit light such as regions 26 and may have thermally imprinted light-emitting regions 28. Light-emitting regions 28 may be associated with respective keys 80. Each key may have a corresponding key member 90 that can be pressed inwardly to compress a respective dome switch using pressure from a user's finger 94 or other external object. Control circuitry 36 can monitor the states of dome switches 86. When a dome switch is compressed, control circuitry 36 can detect the key input of a user and can take suitable action.

As shown in FIG. 11, key member 90 and, if desired, support layer 96 may be omitted. In this type of arrangement, fabric 40 may overlap dome switches 86 directly without any intervening key members 90. Other configurations for keyboards or other fabric-based items 10 may be used, if desired. The configurations for the illustrative keyboards of FIGS. 10 and 11 are merely illustrative.

Figure 12:
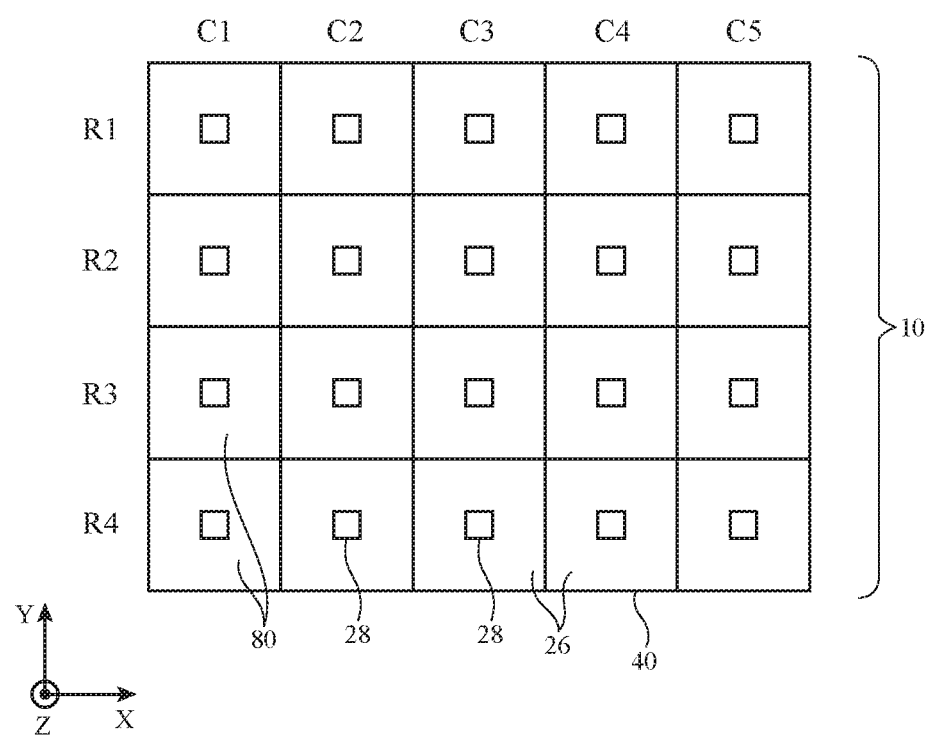
FIG. 12 is a top view of an illustrative device such as a keyboard having fabric with light-emitting regions in accordance with an embodiment.

FIG. 12 is a top view of an illustrative layout for a portion of a key array in item 10. As shown in FIG. 12, item 10 may include keys 80 arranged in rows R1, R2, R3, and R4 and columns C1, C2, C3, C4, and C5. Optical fibers 10 may run parallel to the rows of keys 80 (e.g., parallel to horizontal dimension X) and/or may run parallel to the columns of keys 80 (e.g., parallel to vertical dimension Y). This allows selected portions of the keyboard to be illuminated. As an example, if the optical fibers 10 that overlap the first row R1 of item 10 are provided with light, the key labels in the keys 80 of the first row will be illuminated. As another example, one or more selected columns of keys 80 may be illuminated. Configurations in which one row is illuminated by a first amount and a second row is illuminated by a second amount that is different than the first amount (or in which columns are illuminated by different amounts) may also be used. In some arrangements, light sources 16 may be adjusted so that different regions 28 are provide with different colors of light 18. As an example, in a first mode of operation, a first region 28 may be provided with red light 18 and a second region 28 may be provided with green light. In a second mode of operation, both regions 28 and 28 may be provided with white light. In a third mode of operation, the first and second regions may be provided, respectively, with green and red light. As these examples demonstrated, control circuitry 36 can dynamically adjust the color and/or intensity of the light emitted from one or more independently adjustable light-emitting regions 28 (or sets of regions 28) by adjusting the light 18 that is emitted by light sources 16. This allows the appearance of item 10 to be adjusted dynamically (e.g., to reconfigure a keyboard, to adjust key labels for different keyboard modes of operation such as different languages, to adjust the visual appearance of item 10 for aesthetic considerations, and/or to otherwise adjust the visual appearance of item 10).

The foregoing is merely illustrative and various modifications can be to the described embodiments. The foregoing embodiments may be implemented individually or in any combination.

What is claimed is:

1. A fabric-based item, comprising:
    a fabric layer having a thermally imprinted light-emitting region;
    an optical fiber in the fabric layer, wherein the optical fiber has a core with a first index of refraction and has a cladding with a second index of refraction that is less than the first index of refraction, wherein the cladding forms an outer surface of the optical fiber, and wherein the optical fiber has light-scattering structures formed from recesses in the outer surface of the optical fiber in the thermally imprinted light-emitting region of the fabric layer;
    a light source that is configured to provide light to the optical fiber that is emitted from optical fiber in the thermally imprinted light-emitting region; and
    control circuitry configured to adjust the light source to control the light emitted from the thermally imprinted light-emitting area.

2. The fabric-based item defined in claim 1 wherein the optical fiber has a first melting temperature, wherein the fabric layer includes strands of material with a second melting temperature that is higher than the first melting temperature and that do not have thermally imprinted recesses, and wherein the core comprises polymethyl methacrylate.

3. The fabric-based item defined in claim 2 further comprising conductive strands of material in the fabric layer.

4. The fabric-based item defined in claim 1 further comprising:
    a printed circuit; and
    an array of dome switches on the printed circuit that are overlapped by the fabric layer, wherein the thermally imprinted light-emitting region forms keyboard key labels that each overlap a respective one of the dome switches.

5. The fabric-based item defined in claim 1 wherein the fabric layer includes a conductive strand of material that forms a capacitive touch sensor electrode and wherein the thermally imprinted light-emitting region overlaps the capacitive touch sensor electrode.

6. The fabric-based item defined in claim 1 wherein the light source comprises a light-emitting diode.

7. The fabric-based item defined in claim 6 wherein the light emitted from the thermally imprinted light-emitting region has a color and wherein the control circuitry is configured to control the light source to adjust a color.

8. The fabric-based item defined in claim 1 wherein the optical fiber comprises one of multiple optical fibers in the fabric, the fabric-based item further comprising:
    an optical coupler having an input port coupled to the light source and multiple output ports each of which is coupled to a respective one of the optical fibers.

9. The fabric-based item defined in claim 1 wherein the fabric comprises woven fabric with warp and weft strands and wherein the optical fiber forms one of the weft strands and extends back and forth across the fabric in multiple rows of the fabric.

10. A keyboard, comprising:
    a woven fabric having woven warp and weft strands including optical fibers, wherein the woven fabric has thermally imprinted light-emitting regions;
    light sources coupled to the optical fibers that are configured to provide light to the optical fibers that is emitted from the thermally imprinted light-emitting regions; and
    an array of keys, each key overlapping a respective one of the thermally imprinted light-emitting regions, wherein the thermally imprinted light-emitting regions comprise key labels and wherein each key has a switch that is overlapped by a respective one of the key labels.

11. The keyboard defined in claim 10 wherein the switches comprise dome switches and wherein each key has a key member that overlaps a respective one of the dome switches.

12. The keyboard defined in claim 11 further comprising:
a printed circuit; and
flexible coupling structures that couple the key members to the printed circuit.

13. The keyboard defined in claim 10 wherein each of the optical fibers has a polymer core with a first index of refraction and has a polymer cladding with a second index of refraction that is less than the first index of refraction and wherein each of the optical fibers has, within one of the thermally imprinted light-emitting regions of the fabric layer, thermally imprinted light-scattering recesses in the cladding of that optical fiber.

14. The keyboard defined in claim 10 wherein the light sources comprise light-emitting diodes including a first light-emitting diode that produces light that is emitted from a first of the thermally imprinted light-emitting regions and a second light-emitting diode that produces light that is emitted from a second of the thermally imprinted light-emitting regions.

15. The keyboard defined in claim 14 further comprising:
control circuitry configured to adjust the first and second light-emitting diodes to cause the first thermally imprinted light-emitting region to emit more light than the second thermally imprinted light-emitting region.

16. A method of forming a fabric-based item, comprising:
intertwining strands of material with polymer optical fibers to form fabric, wherein the optical fibers each have a polymer core with a first index of refraction and a polymer cladding surrounding the polymer core with a second index of refraction that is different than the first index of refraction; and
with a textured mold, thermally imprinting selected regions of the fabric to form respective thermally imprinted light-emitting regions by imprinting light-scattering recesses in an outer surface of the polymer cladding.

17. The method defined in claim 16 wherein the textured mold has regions with protrusions and wherein imprinting the selected regions comprises:
heating the protrusions; and
pressing the heated protrusions in the regions with protrusions into the polymer optical fibers to form the light-scattering recesses in the polymer optical fibers.

18. The method defined in claim 17 wherein the second index of refraction is less than the first index of refraction and wherein pressing the heated protrusions comprises pressing the heated protrusions into the polymer cladding.

19. The method defined in claim 18 further comprising coupling a light-emitting diode to a respective end surface of each of the polymer optical fibers.

* * * * *